(No Model.)
C. A. JOHNSON.
PERCH FOR BIRDS.
No. 540,495.          Patented June 4, 1895.
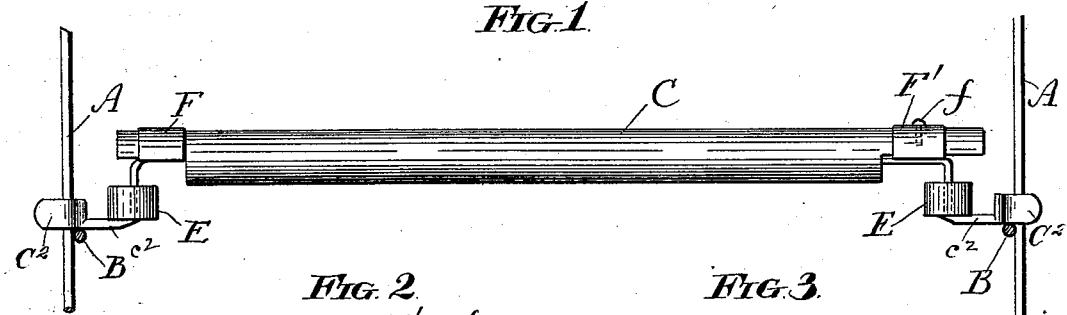
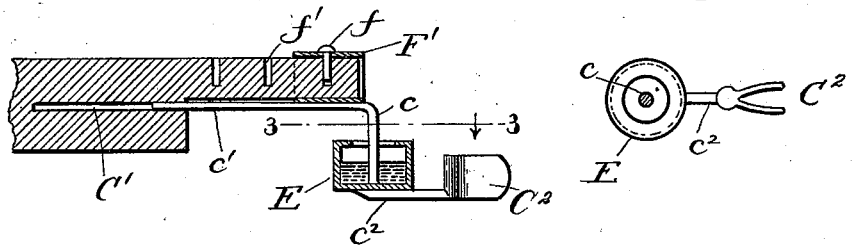 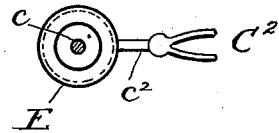
Witnesses.
J. Halpenny
Geo. F. Bailey
Inventor:
Carl A. Johnson
By his Attorneys
Gridley & Hopkins

UNITED STATES PATENT OFFICE.

CARL A. JOHNSON, OF PULLMAN, ILLINOIS.

PERCH FOR BIRDS.

SPECIFICATION forming part of Letters Patent No. 540,495, dated June 4, 1895.

Application filed August 11, 1894. Serial No. 520,045. (No model.)

*To all whom it may concern:*

Be it known that I, CARL A. JOHNSON, a citizen of the United States, residing at Pullman, in the county of Cook and State of Illinois, have invented certain new and useful Improvements in Perches for Birds, of which the following is a specification, reference being had to the accompanying drawings, which are made a part hereof, and in which—

Figure 1 is a side elevation of a perch embodying the invention. Fig. 2 is a vertical longitudinal section of a portion thereof. Fig. 3 is a horizontal section on the line 3 3, Fig. 2, the parts below the cutting plane being shown in plan view.

The object of the present invention is to provide a removable perch with vermin traps of such a nature and so located that vermin cannot reach the perch, the accomplishing of this object being of especial importance where a number of birds are confined in a large cage, and the invention consists in the features of novelty that are particularly pointed out in the claim hereinafter.

In the drawings, A represents the vertical and B the horizontal wires of a cage.

C is a perch the supports for which are surrounded by cups E, in which is placed grease or oil (such for example as sweet oil, crude petroleum, kerosene or the like), or other substance of such a nature that vermin cannot crawl from the cage to the perch.

The perch is supported at both ends, and the portions of the supports surrounded by the cups are shown at $c$. They are fixed to collars F and F' that surround the perch proper, and are also soldered, or otherwise secured to the bottoms of the cups. Preferably at least one of the collars (F' as shown in the drawings) is adjustable lengthwise upon the perch, and in order to hold it in place when adjusted I perforate it and provide a pin $f$, that is adapted to pass through the perforation and enter any one of a series of perforations formed in the perch, and in order to give stability to this adjustable part, the portion $c$ of the support is continued inward past the collar as shown as $c'$, and enters a perforation C' in the end of the perch; or the pin may be simply driven into the perch, as the latter is usually made of soft wood, or any other means for securing it may be used. The continuations $c^2$ of the supports are secured to the bottoms of the cups and terminate in forks $C^2$ that are adapted to rest upon the horizontal wires of the cage and receive the vertical wires between them.

What I claim as new is—

The combination with a perch and its supports, of vermin traps consisting of cups adapted to contain a substance through which vermin cannot pass, said supports consisting of portions extending downward from the ends of the perch and into the cups, and portions proceeding horizontally from the outside of the cups and having their extremities bifurcated for receiving between them the vertical wires of the cage, substantially as set forth.

CARL A. JOHNSON.

Witnesses:
L. M. HOPKINS,
J. HALPENNY.